May 31, 1932.  E. W. SCHELLENTRAGER ET AL  1,860,396
VEHICLE
Filed Nov. 15, 1929   2 Sheets-Sheet 1
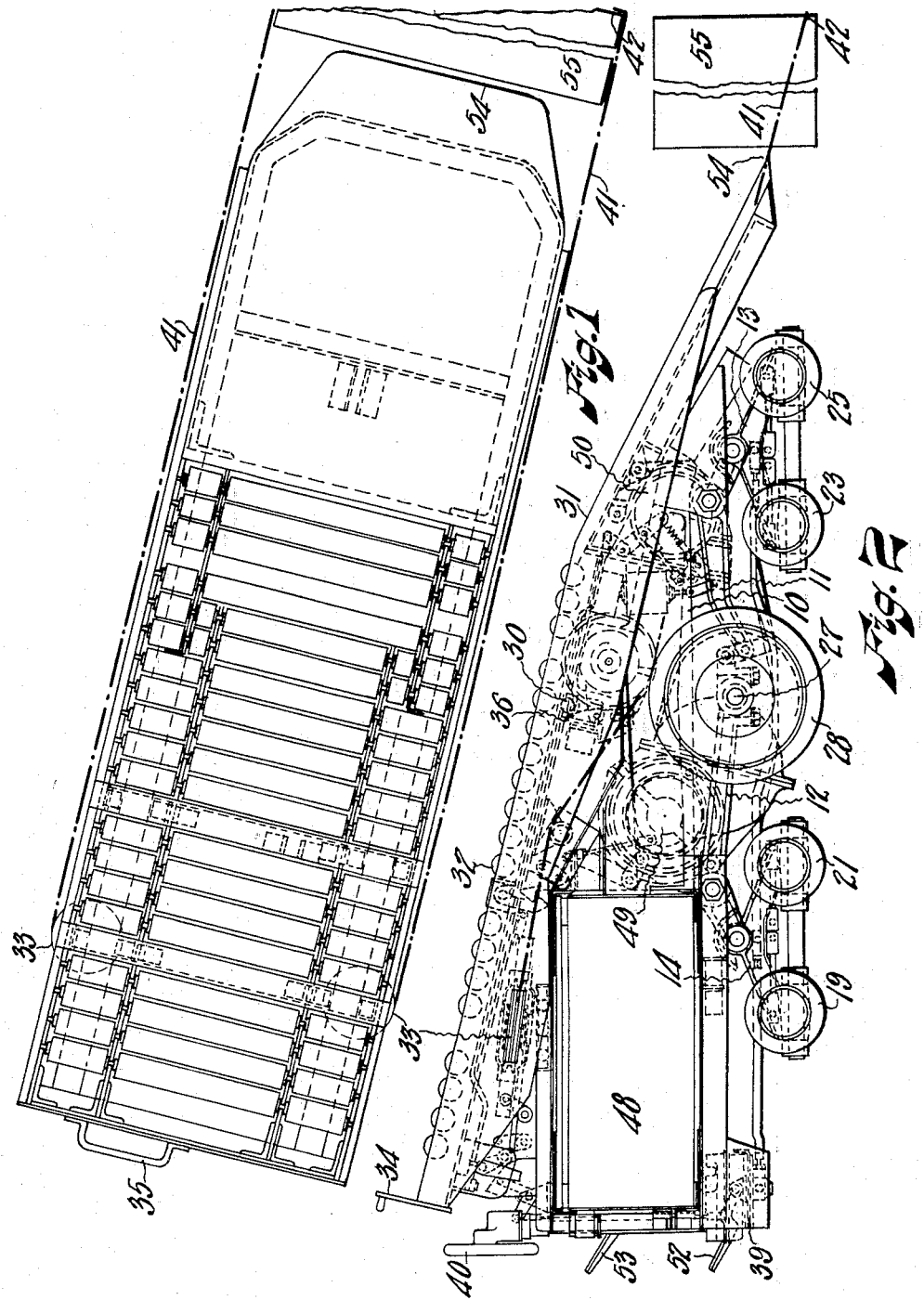
Inventors
E. W. Schellentrager
B. E. Clarkson
By C. F. Heinkel,
Attorney

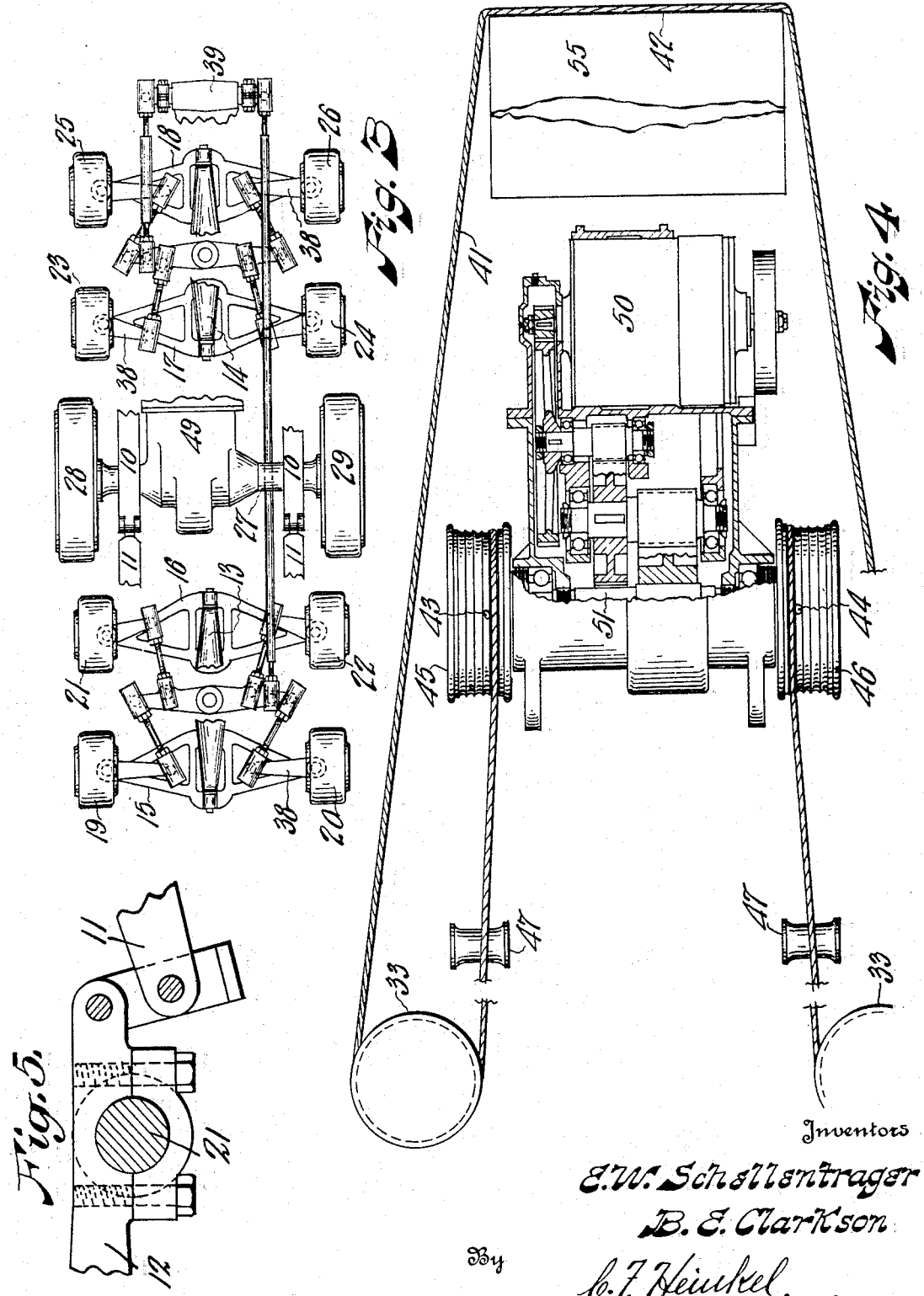

Patented May 31, 1932

1,860,396

UNITED STATES PATENT OFFICE

EUGENE W. SCHELLENTRAGER, OF SHAKER HEIGHTS, AND BRADLEY E. CLARKSON, OF CLEVELAND, OHIO, ASSIGNORS TO ATLAS BOLT & SCREW COMPANY, OF CLEVELAND, OHIO

VEHICLE

Application filed November 15, 1929. Serial No. 407,417.

Our invention relates to vehicle structures with particular reference to such vehicles as are commonly known as commercial trucks.

Objects of our invention are:—

A simple, inexpensive, easily operable and efficient vehicle having self propelling means, or self load handling means or steering means, or any of these means combined; which has a platform with the loading surface thereof free of lateral and vertical obstruction so that a load can be moved thereon or therefrom either sidewise or endwise or a load wider or longer than the platform can be carried thereon; in which the platform is tiltable so that at least one edge or end thereof can be moved toward and into contact with and away from a floor; which can be steered on a small radius; which has a larger leading area compared with the structure thereof; which is compact and of minimum size laterally and vertically; as which can move about or take on or discharge a load in a minimum of space and can enter or leave a low or a narrow or a low and narrow entrance or exit.

Other objects will be made known during the description of the vehicle shown and described herein or will become apparent or obvious or will suggest themselves upon an inspection of the accompanying drawings and of this specification.

For illustration purposes, but not for limitation purposes, we show in the accompanying drawings and describe in this specification in detail one type of vehicle embodying our invention with the understanding that we are aware that our invention can be applied to other types of vehicles.

In vehicles, particularly in the type known as commercial trucks, it is quite desirable to have a large loading area and that a vehicle be able to enter or leave through small doors or openings and move about in a small space. In a freight car for instance, the doors are comparatively small. When a loaded car is to be unloaded, the procedure in the prior art is to move the individual parts of the load by hand trucks or manually to and out of the car through the door and then handle them again to load them onto a truck. When a car is to be loaded, the above procedure is reversed. In both cases considerable time and effort is wasted.

With our invention, the vehicle itself enters the car, picks up or discharges its load within the car, moves about in the car to discharge its load at a particular place or to take on a load from a particular place without any intermediate handling of the load and leaves the car and travels on to a further destination to either discharge the load taken on in the car or to take on a new load to be transferred to the car or otherwise.

Our invention includes the necessary means so that one operator can handle the vehicle and steer and load and unload the same although some additional time can be saved if a helper is also employed to assist the operator.

In the accompanying drawings mentioned above:—

Fig. 1 is a plan view of the platform of the vehicle shown in Fig. 2.

Fig. 2 is a side view of a dirigible self propelling self loading vehicle embodying our invention.

Fig. 3 is a plan view of the steering means of the vehicle shown in Figs. 1 and 2.

Fig. 4 is a plan view of the load handling means of the vehicle shown in Figs. 1 and 2.

Fig. 5 is a sectional view showing the hinged connection between the main axle and two of the pivoted parts of the frame.

Similar reference characters refer to similar parts throughout the views.

The particular vehicle shown in the accompanying drawings and specifically described herein comprises, principally, a chassis, a platform thereon, a steering means, a load handling or moving means, a power plant, and control means.

The chassis

The chassis is shown as comprising the frame 10, the arms 11 pivoted thereon at one end thereof to swivel on an axis transversely of the vehicle, the arms 12 pivoted thereon at the other end thereof to swivel on an axis transversely of the vehicle, the part 13 pivoted on one end of the arms 11 to swivel on an axis transversely of the vehicle, the part 14 pivoted on one end of the arms 12 to swivel on an axis transversely of the vehicle, the axles 15 and 16 pivoted on the respective ends of the part 13 to swivel on an axis longitudinally of the vehicle, the axles 17 and 18 pivoted on the respective ends of the part 14 to swivel on an axis longitudinally of the vehicle, the steering wheels 19 and 20 pivoted on the respective ends of the axle 15 to swivel on an axis vertically of the vehicle, the steering wheels 21 and 22 pivoted on the respective ends of the axle 16 to swivel on an axis vertically of the vehicle, the steering wheels 23 and 24 pivoted on the respective ends of the axle 17 to swivel on an axis vertically of the vehicle, the steering wheels 25 and 26 pivoted on the respective ends of the axle 18 to swivel on an axis vertically of the vehicle, the main axle 27 journaled on the connected other ends of the arms 11 and 12, the driving wheels 28 and 29 on the respective ends of the axle 27 and rotatable therewith and the pivot pin 30 in the present instance a shaft extending transversely of the vehicle.

Due to the particular structure of the chassis and the parts swivable on the axes as described, each one of the steering wheels is always in contact with the floor irrespective of how uneven the floor may be and a load is distributed on all of the wheels and this feature not only promotes effective steering but also distributes the load on the vehicle over a maximum floor area. Any other suitable chassis can be used in place of the one just described.

The platform

The platform is shown as comprising the frame 31, the friction reducing rollers 32 journaled therein transversely of the platform, the sheave wheels 33 journaled thereon at the sides thereof on shafts angular to the load receiving surface of the platform with the outer edges of the sheave wheels extending just sufficiently far beyond the side edges of the platform to permit a load handling cable to pass outside of this frame, the load stop plate 34 on the operator's end of the platform to stop movement of a load in the event that it is not stopped previously by other means, and the handle 35 on the same end of the platform.

The platform is shown as having the journal bearings 36 to support the platform pivotally or tiltably on the previously mentioned shaft 30 and consequently on the chassis. It is preferred that the pivot of the platform is located at or near the center of gravity of the platform so that an operator can tilt the platform easily by means of the handle 35 or otherwise if necessary and is preferably located a little back of this center of gravity toward the loading end of the platform so that the same normally tends to remain in load carrying position.

In this instance, the platform has a load carrying surface in two planes angular with each other so that the vehicle as a whole can be shortened and still provide sufficient room below the load carrying surface for the power and operating means for the vehicle.

It is observed that all parts of the chassis are confined within the lateral boundaries of the platform so that a loading area as large as possible is available and are confined below the plane of the load carrying surface so that a load wider or longer than the load carrying surface can be carried thereon or a load can be slid or moved onto or from the same sidewise or endwise without lifting the load above obstructions or removing obstructions.

A platform having a load carrying surface in one plane or in more than two planes or curved or of other formation, or of a suitable structure other than set forth, or suitably pivoted or hinged or movable can be used.

The steering means

The steering means is shown as the steering arms 38 extending from the corresponding steering wheels and equalizing and connector means in operative connection with the steering member 39 which is in operative connection with and operated by the handwheel 40. All parts of the steering means are confined within the lateral boundaries of the chassis and of the platform for purposes explained above.

It is observed that this steering means permits the vehicle to operate on a very small radius and thereby permits the vehicle to be operated in a small space.

Other kinds of suitable steering means can be used.

The load handling means

The load handling means is shown as comprising a cable-like flexible member in the form of a rope 41 having the loop portion 42 and the ends 43 and 44 thereof secured to the drums 45 and 46 so that the same can be wound thereon and passing over the previously mentioned sheave wheels 33 to retain the rope at the outside of the side edges of the platform and below the plane of the load carrying surface thereof and also passing over the sheave wheels 47 mounted on the under side of the platform to clear mechanism on the chassis below the platform.

Other suitable kinds of load handling means can be used.

The power plant

The power plant is shown as the electric storage battery 48 carried on the chassis, the vehicle propelling motor 49 carried on the chassis and supplied with power from the battery 48 and in operative relation with and operating the main axle 27 and the driving wheels 28 and 29 thereon, and the load handling motor 50 carried on the underside of the platform and in operative connection with and operating the shaft 51 on which the drums 45 and 46 are mounted to rotate therewith.

Other types of suitable power plants can be used. For instance, an engine and electric generator can be used in place of the storage battery, or an engine in operative connection with the vehicle propelling and load handling means can be used in place of the storage battery and the motors.

As shown the power plant is confined within the lateral boundaries of the chassis and of the platform and below the plane of the load carrying surface thereof.

*The control means*

The control means for the motors may be of any suitable type. The vertically spaced pedal like operator platforms 52 and 53 are journaled on the chassis so that they normally lie close up against the same to reduce the length of the vehicle and serve as an operating means for part of the control means when an operator pivots the same outwardly and stands thereon. The upper pedal is provided so that an operator can use that one when room is too limited to use the lower one. Other operator platform means such as an eccentrically swivable seat can be used for the same purpose.

*Operation*

The vehicle as a whole operates and is operated similar to a dirigible self propelling vehicle.

When a load is to be moved onto the platform, the vehicle is first propelled to move the edge 54 of the platform close to the load 55; the platform is then tilted so that the edge 54 contacts the floor; the loop portion 42 of the rope is then placed over and around the back of the load; the motor 50 is then started whereupon the ends of the rope are wound upon the drums and the loop portion of the rope shortens and the load is thereby moved onto the platform and automatically tilts the platform back to its normal load carrying position when the center of gravity of the load has passed the center of the pivot of the platform.

The load handling means is then locked so that the rope retains the load on the platform.

When the load carrying surface of the platform is inclined, a release of the load means for the load handling means and an upward push on the operator's end of the platform permits the load to slide off of the platform and the quantity of this release determines the speed with which the load is moved off of the platform and deposits the same on the floor.

The vehicle shown and described is simple and efficient, distributes a load over a large floor area, compact to reduce the size thereof; has the largest possible load receiving area, can enter or leave through a narrow door or opening; can operate in a small space, can pick up or discharge a load without any overhead structure, can receive or discharge a load sidewise or endwise, can carry a load wider or longer than the platform, and has no structure above the load carrying surface to limit the size of a load nor the moving thereof.

As mentioned above, we are aware that our application is applicable to vehicles other than the one type shown and described herein; we are also aware that changes and modifications can be made in the structure and in the arrangement of the elements shown and described and mentioned within the scope of the appended claims; therefore without limiting ourselves to the precise application of our invention as shown and described nor to the precise structure and arrangement of elements as shown and described.

We claim:

1. In a vehicle, the combination of, a main axle and vehicle driving wheels thereon, a chassis comprising pivoted arms hinged together at said main axle, steering wheel carrying axles pivoted onto each of said arms at each side of said main axle and having co-operating vehicle steering wheels thereon, a load carrying platform pivoted onto said chassis with the axis of the pivot transversely of said chassis, a motor to rotate said driving wheels located below said platform, and a power source for said motor located below said platform.

2. In a vehicle, the combination of, an axle and vehicle propelling wheels thereon, a chassis comprising vertically movable arms in hinged connection to said axles and to each other, vertically movable co-operating vehicle steering wheels carried by said arms, a load carrying platform pivoted onto the top of said chassis; power means for propelling the vehicle and handling a load on said platform and steering means for the vehicle located below said platform and in close proximity to said propelling wheels.

3. A chassis including an axle, a part forwardly of said axle and hinged thereon to swivel vertically, and a part rearwardly of said axle and hinged onto said forward part near said axle to also swivel vertically co-operatively with and independently of said forward part.

4. A chassis including an axle, a vertically movable part forwardly of said axle, a vertically movable part rearwardly of said axle, a hinge connection between said axle and both of said parts; one of said parts movable vertically co-operatively with and independently of said other part, and a frame connecting both of said parts.

5. A chassis for a vehicle including a main axle and wheels thereon, a vertically movable part forwardly of said axle, a vertically movable part rearwardly of said axle, a hinge connection between said axle and both of said parts, one of said parts movable vertically co-operatively with and independently of said other part, a frame in hinged connection with both of said parts, and co-operatively steering wheels on each of said parts.

6. A chassis for a vehicle including a main axle and wheels thereon, a vertically movable part forwardly of said axle, a vertically movable part rearwardly of said axle, a hinge connection between said axle and both of said parts, one of said parts movable vertically co-operatively with and independently of said other part, a frame in hinged connection with both of said parts, at least two co-operatingly steering wheels on each of said parts, and a steering means adapted to move the axes of said steering wheels in co-ordination with the axis of said axle so that all of said wheels roll freely and co-ordinately on a floor.

7. A vehicle including a main axle and wheels thereon, a wheeled framing extending forwardly and rearwardly of said axle and hinged onto said axle, the wheels on said framing supporting the same, a load carrying platform pivoted onto said framing, the axis of the pivot for the platform located substantially vertically of said axle, and said framing formed so that said platform can be tilted to bring an end thereof into contact with a floor.

8. A power vehicle including a main axle and driving wheels thereon, a wheeled framing hinged onto said axle and extending forwardly and rearwardly thereof and comprising hinged together parts, the wheels of the vehicle spaced as close together, longitudinally of the vehicle, as minimum sized structure of said framing and clearance for said wheels will permit, a motor for said driving wheels carried by said framing, a power source for said motor carried by said framing, and a load carrying platform supported on said framing and vertically covering the same and said motor and said power source to provide maximum load carrying area and to vertically protect the lower structure of the vehicle.

9. A power vehicle including a main axle and driving wheels thereon, a wheeled framing hinged onto said axle, forwardly and rearwardly thereof and comprising hinged together parts, the wheels of the vehicle spaced as close together, longitudinally of the vehicle, as minimum sized structure of said framing and clearance for said wheels will permit, a load carrying platform supported on said framing and vertically covering the same, a load moving means for said platform, a motor for said driving wheels carried by said framing and located beneath said platform, a motor for said load moving means beneath said platform, and a power source for said motors beneath said platform.

In testimony of the foregoing we affix our signatures.

EUGENE W. SCHELLENTRAGER.
B. E. CLARKSON.